Patented Nov. 9, 1937

2,098,759

UNITED STATES PATENT OFFICE 2,098,759

PRODUCTION OF THIO-ETHERS

Walter Reppe and Hanns Ufer, Ludwigshafen-on-the-Rhine, Germany, assignors to I. G. Farbenindustrie Aktiengesellschaft, Frankfort-on-the-Main, Germany No Drawing. Application August 1, 1935, Serial No. 34,297. In Germany August 4, 1934

5 Claims. (Cl. 260—150)

The present invention relates to a process of producing thio-ethers.

We have found that valuable thio-ethers are obtained by causing vinyl sulphones or sulphoxides containing but one vinyl group attached to a sulphur atom to react with compounds containing at least one SH-group.

Vinyl sulphones or sulphoxides are compounds of the general formula $CH_2=CH.SO_2.R$ or $CH_2=CH.SO.R$ in which R is a saturated or unsaturated alkyl group, containing at least 6 carbon atoms, as for example a hexyl, dodecyl, octodecyl or octodecenyl group, an aryl group, as for example a phenyl group, the radicle of a polynuclear isocyclic compound e. g. a naphthyl group or of a heterocyclic compound, an aralkyl group, as for example a benzyl or phenylethyl group, or a cyclo-aliphatic radicle. The groups or radicles may contain as substituents any other further atoms or atomic groups, as for example halogens or alkyl, hydroxyalkyl, nitro, hydroxy or sulphonic or carboxylic acid groups.

Vinyl sulphones and sulphoxides which contain the groups $—SO_2—CH=CH_2$ or $—SO—CH=CH_2$ several times in the molecule may also frequently be caused to react in a corresponding manner. As compounds which contain at least one SH-group may be mentioned for example hydrogen sulphide, alkylmercaptans and hydroxyalkylmercaptans, for example ethylmercaptan, propylmercaptan, isobutylmercaptan, octodecylmercaptan, octodecenylmercaptan, monothioalkyleneglycols, dithioalkyleneglycols, monothioglycerines, dithioglycerines, and trithioglycerines, aromatic mercaptans, for example thiophenol, thiocresols, disulphhydrylbenzenes and polysulphhydrylbenzenes,-naphthalenes,-anthracenes and -anthraquinones, mono- and poly-sulphhydryls of other isocyclic and heterocyclic compounds, such as mercaptobenzothiazole and mercaptobenzimidazole, aralkylsulphhydryls, such as phenyl-ethylmercaptan, and cycloaliphatic mercaptans, such as cyclohexylmercaptan. The said compounds may also contain halogen atoms, tertiary combined nitrogen atoms or alkyl, hydroxyalkyl, nitro, hydroxyl, carboxylic acid or sulphonic acid groups, as for example ethyl-, hydroxyethyl, nitro-, hydroxy- or dialkylamino-thiophenols, -thionaphthols, -sulphhydrylanthracenes, and -anthraquinones, thioglycollic acid and their esters, thiosalicylic acid and their esters, sulph-hydrylbenzene, -naphthalene, -anthracene or -benzanthrone sulphonic acids and also compounds which also contain at least one nitrogen atom combined with one or more hydrogen atoms. In the latter case, in addition to the reaction on the SH-group a simultaneous action may take place as described in the application Ser. No. 26,091.

During the reaction, the unsaturated radicle contained in the sulphone or sulphoxide employed is added on to the SH-group. When employing hydrogen sulphide, two unsaturated radicles may also enter the initial compound.

It is advantageous to employ for the reaction elevated temperatures (as for example from 60° to 200° C., in particular from 100° to 160° C.). The employment of diluents, such as alcohols (ethyl, propyl or benzyl alcohol), ketones (acetophenone), ethers (dibenzyl ether), hydrocarbons (toluene or xylene), or halogenated hydrocarbons (chlorbenzene) is frequently of advantage. In many cases it is preferable to employ catalysts which favor the reaction. Especially suitable for this purpose are substances having a basic character as for example small amounts of alkali metal or alkaline earth metal oxides, hydroxides, sulphides, carbonates, acetates, phenolates, alcoholates and mercaptides, zinc oxide, cadmium oxide, or substances acting like bases in the present reaction such as salts of zinc or cadmium with organic acids, especially acetic acid, furthermore little amounts of organic bases such as pyridine or dimethylaniline. The reaction may be carried out at ordinary or increased pressure depending on the boiling point of the initial material or of the diluent.

The new compounds may be used for the preparation of dyestuffs or, when employing suitable initial materials, as dyestuffs themselves, and also as assistants for the textile industry or for combating animal or vegetable pests.

The sulphur bridges contained in the addition products may be further oxidized, if desired, to form sulphoxide or sulphone groups; in this manner the sulphoxides or sulphones acquire more than one $—SO—$ or $—SO_2—$ groups.

The following examples will further illustrate how the said invention may be carried out in practice but the invention is not restricted to these examples. The parts are by weight.

*Example 1*

0.5 part of sodium ethylate is added to a boiling solution of 10 parts of vinyl-para-tolyl-sulphone in 50 parts of toluene and the solution is then saturated with hydrogen sulphide while stirring. A colorless crystalline mass thus separates which is filtered off by suction after cooling. By crystallization from toluene the compound is obtained in a pure state. It melts at 163° C. According to analysis it has the composition $C_{18}H_{22}S_3O_4$. It has therefore been formed by the adding on of two molecules of vinyl-paratolyl-sulphone to one molecule of hydrogen sulphide; it probably has the formula:

It may also be obtained by heating the said mixture with hydrogen sulphide in a pressure-tight vessel.

Example 2

50 parts of ethylmercaptan, 50 parts of vinyl-para-tolyl-sulphone and 1 part of sodium methylate are heated under reflux for 20 hours, the condenser being supplied with ice-cold water. The excess of ethylmercaptan is then distilled off and the residue purified by crystallization from methyl alcohol. The melting point of the new compound is from 84° to 85° C. It has been formed by the adding together of one molecule of each of the initial materials and probably has the formula:

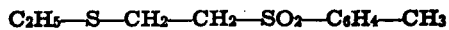

C₂H₅—S—CH₂—CH₂—SO₂—C₆H₄—CH₃

Example 3

150 parts of para-thiocresol, 180 parts of vinyl-para-tolyl-sulphone and 300 parts of toluene are heated for 12 hours under reflux. A clear solution is obtained from which the addition compound is precipitated in colorless crystals by the addition of ligroin. By trituration with aqueous ammonia for the purpose of removing small amounts of unchanged thiocresol and crystallization from alcohol, the product is obtained in a pure state. It melts at from 83° to 84° C. and has been formed by the adding together of one molecule of each of the initial materials. It probably has the formula:

CH₃—C₆H₄—S—CH₂—CH₂—SO₂—C₆H₄—CH₃

The compound may also be obtained by working without solvents.

Example 4

A mixture of 200 parts of 2-mercapto-5-chlortoluene, 180 parts of vinyl-para-tolyl-sulphone and 200 parts of toluene is boiled under reflux for from 15 to 20 hours. The addition compound is precipitated in colorless crystals from the clear solution by the addition of ligroin. It may be purified by trituration with aqueous ammonia and crystallization from alcohol and then melts at from 79° to 80° C. It is formed by the adding together of one molecule of each of the initial materials and probably has the formula:

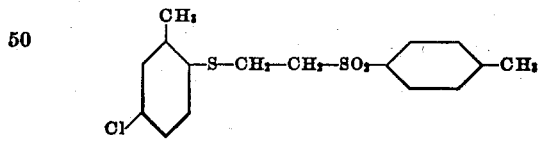

By adding small amounts of alkali or alkaline earth metals or sodium, potassium or calcium alcoholates, the reaction may be accelerated.

Example 5

25 parts of 1-chlor-8-mercaptonaphthalene, 50 parts of toluene and 23 parts of vinyl-para-tolyl-sulphone are boiled for 15 hours under reflux. After cooling, the deposited crystals are filtered off by suction and purified by crystallization from alcohol. The melting point is from 172° to 174° C. The new compound has been formed by the addition together of 1 molecule of each of the initial materials and has the formula:

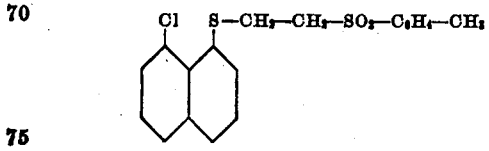

The addition compounds from other aromatic mono- and polymercaptans and other vinyl sulphones or vinyl sulphoxides are obtained in a corresponding manner.

Example 6

A solution prepared from 90 parts of thioglycollic acid, 200 parts of water and 58 parts of calcined sodium carbonate is heated with 180 parts of vinyl-para-tolyl-sulphone for from 20 to 24 hours under reflux at about 100° C. The whole is then diluted with 3000 parts of water, cooled, filtered by suction if necessary from undissolved constituents and the addition compound formed precipitated by means of hydrochloric acid. The compound is filtered off by suction, washed with cold water and purified, for example by crystallization from alcohol. It melts at 146° C. and is difficultly soluble in water and readily soluble in alkali metal carbonate and hydroxide solutions. According to analysis it has been formed by the adding together of one molecule of each of the initial materials and thus corresponds to the formula:

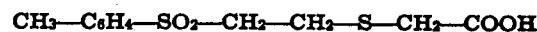

CH₃—C₆H₄—SO₂—CH₂—CH₂—S—CH₂—COOH

The addition compounds with other aliphatic, aromatic, hydroaromatic or heterocyclic carboxylic acids or sulphonic acids which contain one or more SH-groups, and with other vinyl sulphones and vinyl sulphoxides are obtained in a corresponding manner.

Example 7

16 parts of mercaptobenzothiazole, 100 parts of toluene and 19 parts of vinyl-para-tolyl-sulphone are boiled under reflux for 15 hours, preferably after the addition of 0.5 part of sodium ethylate or 0.5 part of powdered sodium or potassium hydroxide. After cooling, the deposited colorless crystals are filtered off by suction and purified by crystallization from toluene. The addition compound thus obtained melts at from 163° to 164° C. and probably has the formula

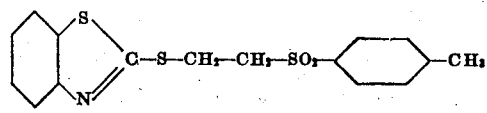

The reaction may also be carried out by employing ethanol instead of toluene.

Example 8

A mixture of 10 parts of 1-mercaptoanthraquinone, 15 parts of vinyl-para-tolyl-sulphone, 300 parts of toluene and 0.5 part of sodium ethylate is boiled for 15 hours under reflux. After cooling, the precipitate is filtered off by suction. Contrasted with 1-mercaptoanthraquinone it is not soluble in dilute alkalies and has a deeper green color. The addition compound probably has the formula:

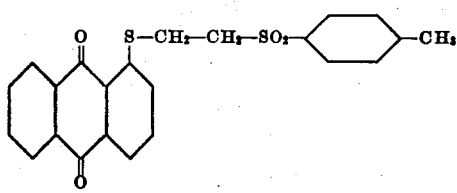

The corresponding addition compound may be obtained from 2-mercaptoanthraquinone in the same manner. It is much deeper yellow in color than the initial material and does not dissolve in dilute alkalies and ammonia.

*Example 9*

A mixture of 10 parts of 1-chlor-8-naphthyl-vinyl-sulphoxide, 6 parts of para-thiocresol and 0.3 part of sodium methylate is heated for 15 hours at about 100° C. The oil obtained, which probably has the composition:

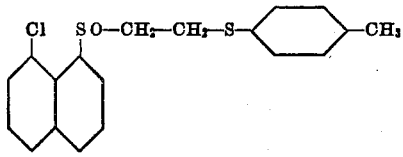

is freed from undissolved constituents, shaken with ammonia and then with water and crystallized from a small amount of ligroin while cooling well. The compound commences to soften at about 30° C.

*Example 10*

A mixture of 10 parts of vinyl octodecyl sulphoxide and 5 parts of thioglycollic acid is heated for four hours at about 130° C. After cooling, the solid mass obtained is separated from the liquid. It may be recrystallized from ethanol and most probably corresponds to the formula

Instead of vinyl octodecyl sulphoxide other vinyl sulphoxides for example vinyl hexyl or dodecyl sulphoxide may be employed.

The addition compounds of other sulphoxides, as for example vinyl-para-tolyl-sulphoxide, with other compounds containing SH-groups, such as hydrogen sulphide or mercapto-benzothiazole, are obtained in a corresponding manner.

What we claim is:—

1. A process of producing thio-ethers which comprises reacting a compound of the general formula $CH_2=CHSO_x-R$ in which $x$ stands for one of the numbers 1 and 2 and R stands for an organic radical selected from the group consisting of an aliphatic radical containing at least 6 carbon atoms and cyclic radicals with a compound containing at least one SH-group selected from the group consisting of hydrogen sulfide, alkyl, hydroxy alkyl, aralkyl and cyclic mono- and polyvalent mercaptans.

2. A process of producing thio-ethers which comprises heating a compound of the general formula $CH_2=CHSO_x-R$ in which $x$ stands for one of the numbers 1 and 2 and R stands for an organic radical selected from the group consisting of an aliphatic radical containing at least 6 carbon atoms and cyclic radicals with a compound containing at least one SH-group selected from the group consisting of hydrogen sulfide, alkyl, hydroxy alkyl, aralkyl and cyclic mono- and polyvalent mercaptans.

3. A process of producing thio-ethers which comprises heating at a temperature between about 60° and about 200° C. a compound of the general formula $CH_2=CHSO_x-R$ in which $x$ stands for one of the numbers 1 and 2 and R stands for an organic radical selected from the group consisting of an aliphatic radical containing at least 6 carbon atoms and cyclic radicals with a compound containing at least one SH-group selected from the group consisting of hydrogen sulfide, alkyl, hydroxy alkyl, aralkyl and cyclic mono- and polyvalent mercaptans.

4. A process of producing thio-ethers which comprises heating at a temperature between about 60° and about 200° C. a compound of the general formula $CH_2=CHSO_x-R$ in which $x$ stands for one of the numbers 1 and 2 and R stands for an organic radical selected from the group consisting of an aliphatic radical containing at least 6 carbon atoms and cyclic radicals with a compound containing at least one SH-group selected from the group consisting of hydrogen sulfide, alkyl, hydroxy alkyl, aralkyl and cyclic mono- and polyvalent mercaptans in the presence of an inert organic diluent.

5. A process of producing thio-ethers which comprises heating at a temperature between about 60° and about 200° C. a compound of the general formula $CH_2=CHSO_x-R$ in which $x$ stands for one of the numbers 1 and 2 and R stands for an organic radical selected from the group consisting of an aliphatic radical containing at least 6 carbon atoms and cyclic radicals with a compound containing at least one SH-group selected from the group consisting of hydrogen sulfide, alkyl, hydroxy alkyl, aralkyl and cyclic mono- and polyvalent mercaptans and an alkaline substance acting as catalyst.

WALTER REPPE.
HANNS UFER.